(No Model.)
A. LISSNER.
GUIDE FOR CUTTING FURS.
No. 284,866. Patented Sept. 11, 1883.
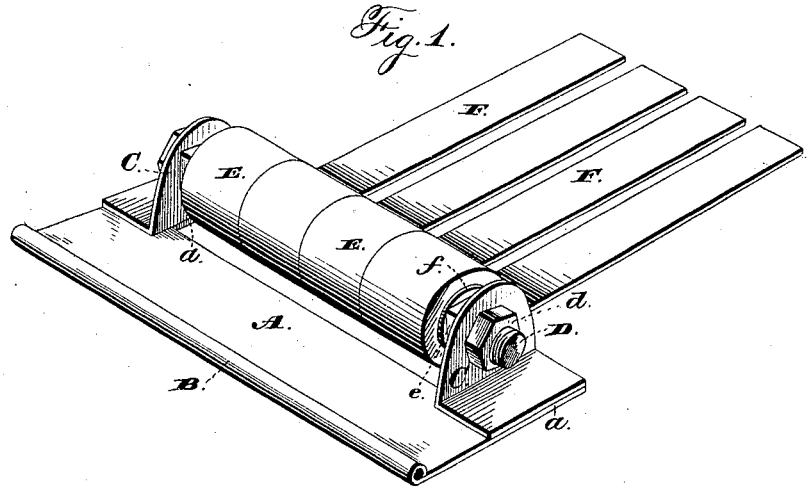
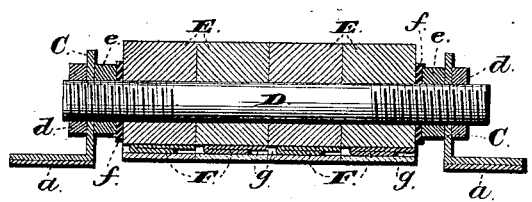
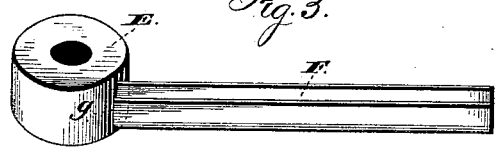

UNITED STATES PATENT OFFICE.

ADOLPH LISSNER, OF NEW YORK, N. Y.

GUIDE FOR CUTTING FURS.

SPECIFICATION forming part of Letters Patent No. 284,866, dated September 11, 1883.

Application filed July 7, 1883. (No model.)

*To all whom it may concern:*

Be it known that I, ADOLPH LISSNER, of New York, in the county of New York, and in the State of New York, have invented certain new and useful Improvements in Guides for Cutting Furs; and I do hereby declare that the following is a full, clear, and exact description thereof, reference being had to the accompanying drawings, in which—

Figure 1 shows a perspective view of my invention. Fig. 2 shows a sectional view on line $x\ x$ of Fig. 1, and Fig. 3 shows a detail view of one of the rulers or guides with its hinge.

The object of my invention is to provide an improvement in rulers or guides for cutting furs; and to this end it consists in the series of rulers or guides hinged to a frame in the manner and with the form of hinge as hereinafter described, and more specifically pointed out in the claims.

In the drawings, A represents the frame to which the guides are hinged, and which is provided at its back with a rib, B, formed, as shown, of a turned-up portion or roll of the metal of which the frame is composed. This rib is intended to slide under fixed guides on the table, as shown in the patent to Biow, No. 256,956, March 7, 1882. The frame is cut away in front, so as to leave two projecting pieces or portions, $a\ a$. Upon these are fastened the upwardly-extending ears C C. These ears, as shown, serve as supports for the stationary shaft or rod D, which is provided at its ends with screw-threaded portions, upon which fit the nuts $d\ d$, which are screwed up against the outer side of each ear, and also the nuts $e\ e$ on the other or inner side of the ears C C. Upon the shaft are journaled the collars E E. In the drawings four of these are shown. At each end of this series of collars is a washer, $f$, upon the shaft, bearing against the outer end of the collar at that end. The nuts $e\ e$ are screwed up, so as to bear against these washers and bring the collars E E into close frictional contact with each other, but not with sufficient force to prevent their turning independently. The nuts $e\ e$ serve not only to adjust the amount of friction between the collars, but also to adjust the whole series of collars lengthwise upon the shaft or rod D, while the nuts $d\ d$ adjust and hold the rod in position in the ears C C. Each of the collars is shown as provided with a slot or opening, $g$, cut deeply therein, and extending between the outer circumference and the journal-opening thereof—that is, the direction of the opening is that of a chord of the circle described around the collar. As shown in Figs. 1 and 2, these openings are intended normally to be in front, and to extend inward and backward in the same horizontal plane. Into these openings $g\ g$ are inserted and fastened the ends of the rulers or guides F F, which are to extend over and be pressed down upon the fur to be cut. As shown, they consist of sheet metal doubled under at their back edges. The doubled-under portion does not extend to the front edge, which is therefore of a single thickness of metal to afford a thin guiding-edge for the cutter. By so doubling under the back edge I make the guides much stronger to resist bending or warping without much increase in weight.

The collars can be made of wood and the guide-strips of tin; but instead of these materials, brass or any desired combination of metals can be used. The kind of material used is not a distinguishing feature of my invention. The strips can be fastened to the collar in other ways than that shown without departure from the spirit of my invention.

The manner of using my device is substantially the same as that of using the cutter-guide shown in the patent referred to, and does not need description here; but by my peculiar construction of hinge for the guide-strips I get rid of a great objection to that guide. The hinges used therewith, especially where the guide-strips were narrow, were found to work loose very soon, so that the edges of the strips were not maintained parallel to each other. As no means were provided either for preventing this loosening by wear or for taking up the same, the guide soon became useless. In my cutter-guide, as described and shown, this working loose of the hinges is almost entirely prevented, and if any wear does occur it can be taken up immediately and the edges of the guides kept parallel. Even if the journals should wear somewhat loose upon the fixed shaft or rod, the guide-arms would still be kept parallel, because of the squared ends of the collars being kept firmly pressed against each other by the screw-nuts.

In the cutter-guide shown and described in the patent the guide-arms are so hinged independently of one another that if the hinge of one works loose on its pivot-pin that arm can fall out of its proper position in relation to the rest. In my guide, however, the working loose of any one hinge-collar does not allow that arm to so fall out of its place, as each collar is firmly held by the ends of the adjacent collars against any play which would carry its arm out of a line at right angles with the pivot-shaft. As the collars are formed with plane ends at right angles to their longitudinal axes, and the edges of the guide-strips extend forward also at right angles to said axes, it follows that all that is necessary to keep the guiding-edges parallel is to keep the ends of the collars bearing firmly against one another by means of the screw-nuts $e\ e$ on the rod.

Having thus set forth the nature of my invention, what I claim as new is—

1. In a fur-cutting guide, the frame carrying the shaft, in combination with the series of collars journaled on said shaft and carrying the guide-arms, substantially as and for the purpose set forth.

2. In combination with the frame of a fur-cutting guide, the ears thereon, the shaft supported in said ears, and the guide-arm carrying collars upon said shaft, substantially as shown and described.

3. In combination with the shaft for the guide-arm collars, the ears on the frame supporting said shaft near its ends, and the screw-nuts on the shaft bearing against the outer side of the ears, substantially as shown and described.

4. In combination with the series of collars journaled on the shaft and carrying the cutter-guide arms, the nuts on the shaft, adapted to be screwed up to force the bearing ends of the collars into contact, substantially as and for the purpose set forth.

5. In a fur-cutting guide, the combination, with the shaft, of a series of collars thereon, formed with their end faces at right angles to their axes, and with the carrying-strips having their guiding-edges extending at a similar angle to the collar-axes, and the screw-nuts on the shaft, adapted to force the collars together into frictional contact, substantially as and for the purpose described.

6. In a fur-cutting guide or ruler, the guide-arms attached to collars on a shaft carried by the guide-frame, and means for adjusting the collars upon the shaft and keeping the ends of the collars in contact, substantially as and for the purpose set forth.

7. In a fur-cutting guide, the combination of the guide-strip, the collar to which it is fastened, and the shaft supported on the frame, substantially as and for the purpose set forth.

8. In a fur-cutting guide, the guide-strip, in combination with the collar journaled on the pivot-shaft on the frame, and provided with a slot or opening for the end of the guide-strip, substantially as and for the purpose set forth.

In testimony that I claim the foregoing I have hereunto set my hand this 26th day of April, 1883.

ADOLPH LISSNER.

Witnesses:
OTTO LADDEY,
JOS. PADGETT.